United States Patent [19]
Shinoda et al.

[11] 4,075,696
[45] Feb. 21, 1978

[54] DATA CONTROL DEVICE FOR SELECTIVELY PROVIDING DATA TO A PROCESSING SYSTEM

[75] Inventors: Nobuhiko Shinoda; Tadao Kusumoto, both of Tokyo, Japan

[73] Assignee: Canon Kabushiki Kaisha, Tokyo, Japan

[21] Appl. No.: 752,171

[22] Filed: Dec. 20, 1976

Related U.S. Application Data

[63] Continuation of Ser. No. 586,412, June 12, 1975, abandoned.

[30] Foreign Application Priority Data

June 17, 1974 Japan .................................. 49-68881

[51] Int. Cl.² ............................................. G06F 15/24
[52] U.S. Cl. ....................................... 364/404; 364/709; 364/900
[58] Field of Search .................. 340/365 R, 172.5; 235/156, 168

[56] References Cited
U.S. PATENT DOCUMENTS

| 3,166,636 | 1/1965 | Rutland | 340/365 R |
| 3,281,526 | 10/1966 | Hutchinson | 340/365 R |
| 3,294,960 | 12/1966 | Townsend | 235/160 |
| 3,558,820 | 1/1971 | Baisch | 340/365 R |
| 3,588,838 | 6/1971 | Felcheck | 340/172.5 |
| 3,808,363 | 4/1974 | Kieffer | 340/365 R |

OTHER PUBLICATIONS

R. B. Battistoni, et al., "Direct Punch for Buffered Key Entry Device", *IBM Tech. Disc. Bull.*, vol. 14, No. 11, April 1972, pp. 3534-3535.

*Primary Examiner*—Jerry Smith
*Attorney, Agent, or Firm*—Fitzpatrick, Cella, Harper & Scinto

[57] ABSTRACT

A data control device for use in recording sales transactions in regard to one or more different items which are subject to various classifications. The device includes data input registers, each of which stores a preset value for a particular item, and a data register into which a desired value for an item not frequently encountered may be entered on a manual keyboard. Selected data from the input registers are successively added and stored in an accumulator except when the keyboard is activated, whereupon data entered on the keyboard is added to the contents of the accumulator.

3 Claims, 2 Drawing Figures

DATA CONTROL DEVICE FOR SELECTIVELY PROVIDING DATA TO A PROCESSING SYSTEM

This is a continuation of application Ser. No. 586,412 filed June 12, 1975 and now abandoned.

BACKGROUND OF THE INVENTION

1. Field of the Invention

This invention relates to data processing apparatus, and more particularly to a data control device which is capable of increasing the classes of data to be processed.

2. Description of the Prior Art

Most conventional information processing apparatus such as, for example, cash registers or accounting machines which are capable of recording transactions, counting money, as well as sorting and totalization are of the mechanical type, and have 4 to 8 classifying ability as they are subject to restrictions in size, shape and cost. Assume, for example, that in the use of such apparatus, the following sales are made:

| | |
|---|---|
| Black tea | Y 100 × 3 |
| Coffee | V 120 × 2 |
| Beer | Y 200 × 1 |

The totalization is made by carrying out the following steps (here the classification is drinks, expressed by Class I):

(1) Enter 100 yen as the unit price of black tea,
(2) Tap the classification key I three times,
(3) Enter 120 yen as the unit price of coffee,
(4) Tap the classification key I twice,
(5) Enter 200 yen as the unit price of beer,
(6) Tap the classification key I once, then,
(7) Obtain the total.

Thus, the counting of even such simple sales involves many operating steps with a high possibility of misoperation, and if the keys of the machine operated are of a mechanical setup and heavy to handle, the operator might suffer from inflammation of a tendon sheath. There are also involved problems of labor hygiene.

Such problems, however, have been alleviated with the development of techniques of electronic circuits and semiconductors in recent years. That is, the accumulators which receive and compute the numerical data of commercial transactions have been changed from a mechanical structure to an electronic mechanism using, for example, core memories or semiconductor memories. Electronic cash registers capable of multiple classifications (hereinafter referred to as ECR) were also developed and are now being put to use.

Such electronics apparaus can easily be arranged to have the function of presetting a unit price for a number of commodities, and hence the totalization of, for example, the above-mentioned sales can be accomplished by the following steps:

(1) Tap the classification key I-1 for black tea thrice.
(2) Tap the classification key I-2 for coffee twice.
(3) Tap the classification key I-3 for beer once.
(4) Push the total key.

Thus, since the unit price of each item is previously set, the operator simply depresses the respective classification keys according to the number of items sold, so that the entire operation is extremely simplified.

According to this system, however, one unit price is set for each classification key, so that if the number of items of commodities are increased, one needs to provide a corresponding number of unit price pre-setting means and classification memories. Also, although selling management can be made for every single item, item-by-item management is not so meritorious for its troublesomeness in the presently existing retail shops.

Therefore, for sales management of groups of commodities, it becomes necessary to obtain the total of each group, as in the conventional apparatus. That is, there is required commodity managment corresponding to the number of commodities for each group as determined by a machine, notwithstanding the fact that the number of commodities varies from group to group.

It is unrealistic to store the preset data for commodities which vary in unit price every day, or for the commodities of which the daily sale is very small. For this purpose, it has been attempted either to provide classifying keys which are not preset, or to use a change-over device which permits input of only the entry data while inhibiting input of the preset data. However, the former has the problem that sale management becomes hard to perform as the commodities of different groups are accumulated in the same memory, while the latter involves the possibility of misoperations due to troublesome change-over operation.

SUMMARY OF THE INVENTION

An object of the present invention is to provide a data control device which is capable of simplifying the data and data input indication when data is fed to a data processing apparatus.

Another object of the present invention is to provide a data control device, which is extremely simple in construction, though is capable of increasing the kinds of data to be treated.

Still another object of the present invention is to provide a data control device which is capable of automatically discriminating the priority order of the data to be fed to the data processing apparatus.

It is still another object of the present invention to provide accumulators for each group of commodities in number in a most rational and realistic way.

It is yet another object of the present invention to preset the unit prices of frequently sold commodities and to connect the line to the input terminals of the accumulator of the corresponding group of commodities so that each selected accumulator has at least more than one unit price presetting function, and in that the preset data are added to the accumulator by depressing the key on which the unit price is set.

It is an additional object of the present invention to provide a data control device in which when any new entry is present, all of the preset data input terminals are made inoperative by a flip flop which discriminates the entry, and when the classifying key is pushed, the entry data are added to the accumulator.

The other objects of the present invention will become apparent from the following detailed description of the preferred embodiments as made in conjunction with the accompanying drawings.

DESCRIPTION OF THE PREFERRED EMBODIMENTS

The drawings show preferred embodiments of the data control device of a practical example of the present invention. According to this device, the desired object can be attained by the following simple procedure:
(1) Tap the key I for black tea thrice.
(2) Tap the key I' for coffee twice.
(3) Enter 200yen as unit price of beer.
(4) Tap key I or key I'.
(5) Push the totaling key.

For particularly important commodities, it is of course possible to set one kind of preset input for one class of memory.

Figure 1:
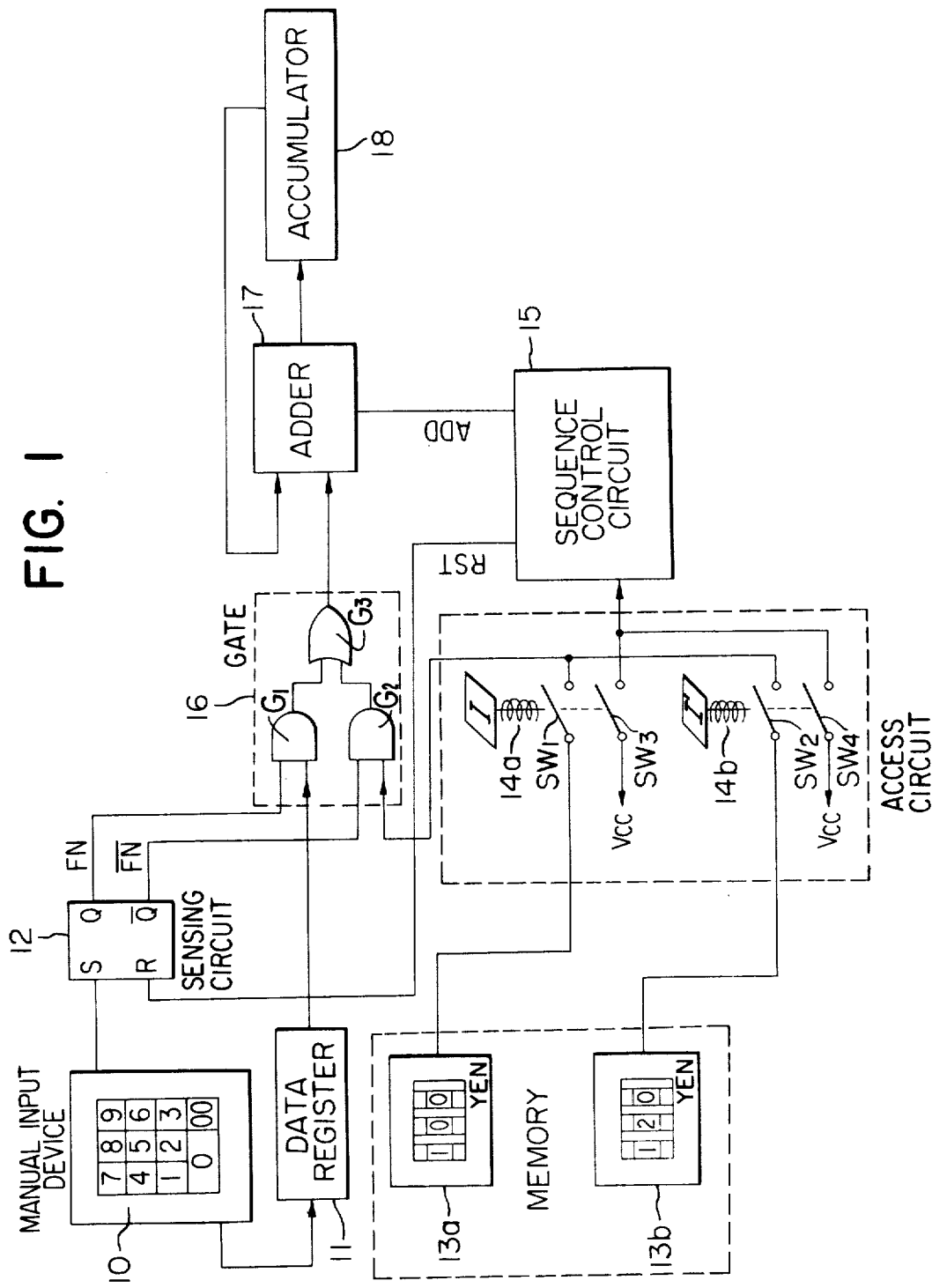
FIG. 1 is a block diagram showing an embodiment of the data control device according to the present invention.

Referring now to FIG. 1, reference numeral 10 indicates a manual input device which is constructed by well known techniques such as used in electronic calculators, see, e.g., U.S. Pat. No. 3,509,329. Numerical data is entered to a data register 11 by operating, for example, 10 keys on the keyboard provided in said device. Also connected to said manual input device 10, is a flip-flop 12 for detecting whether or not the device 10 has been operated.

Numerals 13a and 13b indicate means for setting and storing the preset data. The necessary numerical is set beforehand and stored by mechanical means such as a digital switch, see e.g., U.S. Pat. No. 3,610,889, or by electrical storing means such as core memories or semiconductor memories. These means also have the function to set and indicate the numeral data.

When there are a plurality of preset data, one of the selection means 14a, 14b will be selected by the judgment of the operator. In the shown embodiment, there are provided two selection means corresponding to the setting and storing means 13a and 13b, respectively. Such means are constituted by mechanical contacts or electrical gates. When these means are operated, switches SW1 and SW3 are closed by selection means 14a while switches SW2 and SW4 are closed by selection means 14b, and they perform the transferring of data from said preset data setting and storing means 13a, 13b as well as the driving of a sequence control circuit 15.

Numeral 16 indicates a gate means for controlling transfer of data from data register 11 or data from preset data setting and storing means 13a, 13b to an adder 17 (see, e.g., Digital Computer and Control Engineering [McGraw-Hill 1960] at page 503) by the output of flip-flop 12. This means may be constituted by, for example, AND circuits G1, G2 and OR gate G3. If manual input device 10 is not operated, the output of flip-flop 12 is: $FN = \phi$, $\overline{FN} = 1$, and the data from preset data setting and storing means 13a, 13b are transferred to adder 17 through data means 16 by the operation of selection means 14a, 14b. If manual input device 10 is in operation, $FN = 1$ and $\overline{FN} = \phi$, so that the data fed into data register 11 are transferred to adder 17 through gate means 16 by the operation of said device 10.

The data which can pass gate means 16 are added and operated with the data in accumulator 18 under the control of sequence control circuit 15 in response to the output of flip-flop 12, and the results of operations are stored in accumulator 18. Upon completion of the addition order ADD of sequence control circuit 15, a reset order RST for resetting flip-flop 12, etc., is issued to keep the present data effective until the next manual input is made.

Now the operation in use of the present data control device will be described by way of the aforesaid example where unit prices of 100 yen for black tea and 120 yen for coffee are memorized in the memory means 13a and 13b, respectively. Thus, when the black tea read-out key I (selection means 14a) is operated, switch SW1 will be closed, whereupon switch SW3 interlocked with said switch SW1 will also be closed. Since flip-flop 12 is usually so set that $FN = \phi$ and $\overline{FN} = 1$, data 100 of the preset data setting means 13a is entered to adder 17 through switch SW1, AND gate G2 and OR gate G3. At this time, sequence control circuit 15 is driven by switch SW3 and an addition order ADD is applied to adder 17, so that data 100 of preset data setting and storing means 13a obtained from gate means 16 is stored in accumulator 18, and after a certain predetermined period of time, reset signal RST is given out from sequence control circuit 15 to reset flip-flop 12. However, since flip-flop 12 is in a reset condition, that is, $FN = \phi$ and $\overline{FN} = 1$, the output condition will remains unchanged.

If said operation is repeated twice additionally, then the arithmetic operation of $100 \times 3 = 300$ is accomplished, and the result will be stored in accumulator 18.

Then, when the coffee read-out key I' (selection means 14b) is pushed down twice, the result of the arithmetic operation $100 \times 3 + 120 \times 2 = 540$ will be stored in the accumulator 18 by the same operation as stated above.

Since the unit price of 200 yen for beer is not stored as preset data, 200 must be entered manually from input device 10. Flip-flop 12 is set by the first entry of 2, and data 200 will be stored in data register 11 and applied to adder 17 through gate means 16. Then, when either read-out key I or I' is pushed down, addition order ADD will be issued from the control circuit 15, and the result (740) of the arithmetic operation of $540 + 200$ will be stored in the accumulator 18. Thereafter, reset signal RST is issued to reset flip-flop 12. Now, when the total key (not shown) is pushed, the total sum 740 will be indicated.

Figure 2:
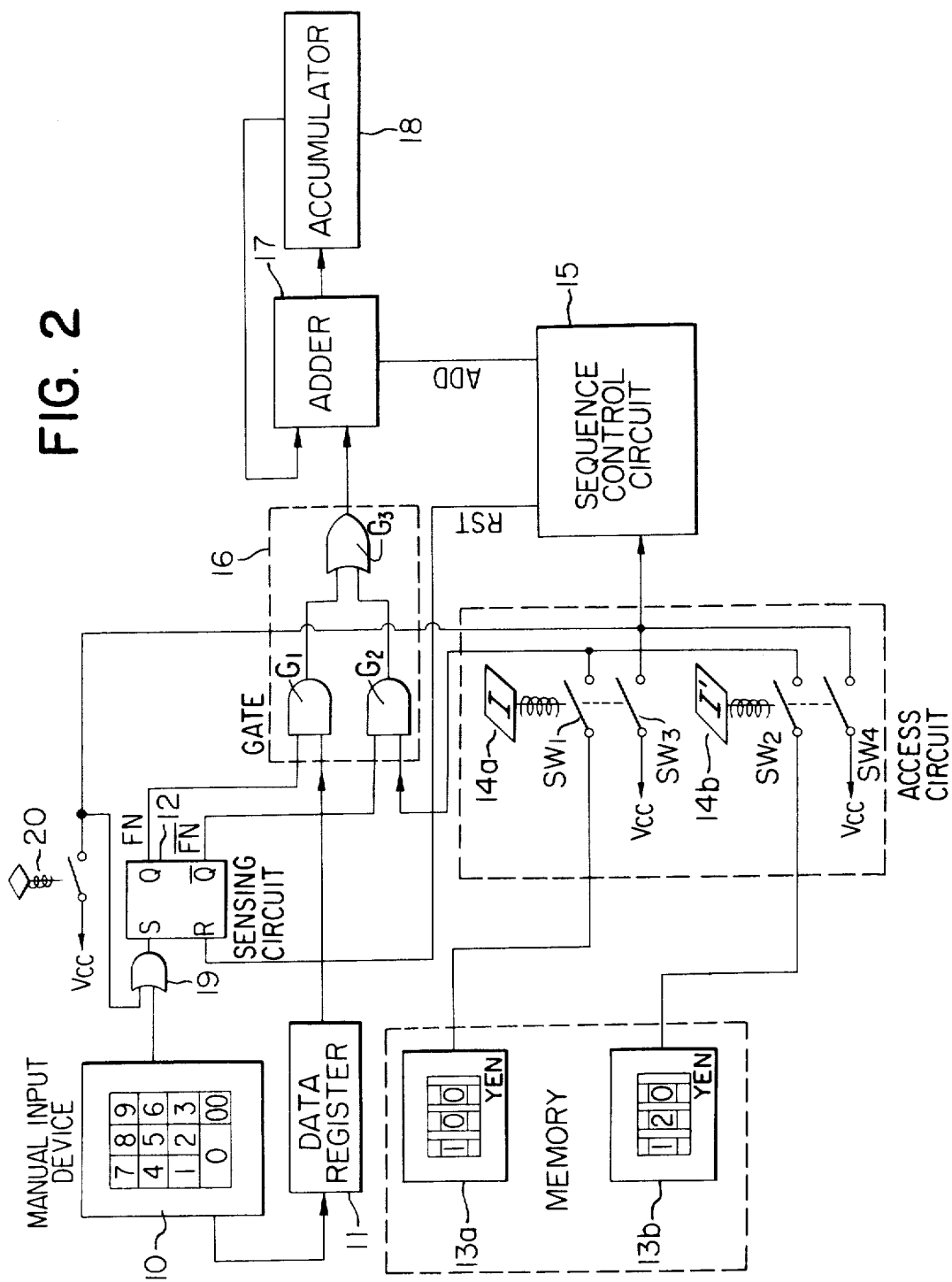
FIG. 2 is a block diagram showing a second embodiment of the data control device according to the present invention.

FIG. 2 shows another embodiment of data control device according to the present invention, where the same parts as in the embodiment of FIG. 1 are assigned the same reference numerals.

This embodiment is designed to use, more than only once, the data fed to data register 11 by manual input device 10. The signal sent out from manual input device 10 to the means (flip-flop 12) for detecting operation of said manual input device 10 is transmitted to flip-flop 12 through OR gate 19, while the signal generated from the key 20, which orders repetitive use of the data of data register 11, is applied to the other input terminal of OR gate 19 and to sequence control circuit 15.

This second embodiment of the present invention will be operated as follows.

When a commodity whose unit price is not memorized in the preset data setting and storing means 13a, 13b appears in the sight of the operator who is operating the ECR, he immediately operates manual input device 10 to memorize the unit price of that particular commodity in data register 11. When the first figure of the unit price is entered, the outputs of flip-flop 12, FN and $\overline{FN}$ are shifted to 1 and $\phi$, respectively, and gate means 16 applies only the data from data register 11 to adder 17 by the output of flip-flop 12. Therefore, if either selection means 14a, 14b is pushed down after the unit price of the commodity has been entered to data register 11 by manual input device 10, an addition order ADD is issued from sequence control circuit 15 to adder 17 to make addition of the content of accumulator 18 and the content of data register 11, and after a certain predetermined period of time a reset order RST is given from sequence control circuit 15 to flip-flop 12 to let the outputs FN and $\overline{FN}$ of flip-flop 12 return to their original conditions, $\phi$ and 1, respectively. During this time, data in data register 11 is retained, and the output FN and $\overline{FN}$ of flip-flop 12 will again shift to 1 and $\phi$, respectively, upon operation of the order key 20, so that the contents of data register 11 are again added to accumulator 18 by sequence control circuit 15 which is driven simultaneously with the operation of the order key 20. It will be understood that if such operation is further continued, the content of data register 11 is further added. It will be also apparent to those skilled in the art that the content of data register 11 is automatically erased by the first input signal of the unit price of the next commodity.

We claim:

1. A data control device for selectively providing data to a processing system comprising:
    an input device having numeral keys for entering first numerical data;
    sensing means responsive to the operation of any one of said numeral keys for providing a predetermined output signal;
    register means responsive to the operation of said numeral keys for storing the first numerical data;
    memory means for storing predetermined second numerical data corresponding to selected items;
    item key means operative to provide access to the second numerical data stored in said memory means;
    a discriminating circuit for selecting the data to be provided to the processing system from the first numerical data stored in said register means and the second numerical data stored in said memory means in accordance with the predetermined output signal from said sensing means; and
    control circuit means for applying the selected numerical data to the processing system, and for actuating said sensing means to remove said predetermined output signal therefrom, wherein when any one of said numeral keys is depressed and then any one of said item keys is depressed, the first numerical data is selected by said discriminating circuit and is provided to the processing system, and when any one of said item keys is depressed without an immediately preceding actuation of a said numerical key, the second numerical data is selected by said discriminating circuit and is provided to the processing system.

2. A data control device according to claim 1, further comprising means coupled to said sensing means and said control circuit means operative to selectively provide repetitive entry of the first numerical data entered on said numeral keys into said processing system.

3. A data control device according to claim 1, wherein said numeral keys comprise 10 keys.

* * * * *